United States Patent Office 2,972,634
Patented Feb. 21, 1961

2,972,634
PREPARATION OF VITAMIN A ALCOHOL
Howard C. Klein, Brooklyn, N.Y., and Roland Kapp, East Orange, N.J., assignors to Nopco Chemical Company, Harrison, N.J., a corporation of New Jersey
No Drawing. Filed Nov. 20, 1957, Ser. No. 697,535
16 Claims. (Cl. 260—617)

This invention relates to the preparation of vitamin A in a novel manner.

The synthesis of vitamin A has engaged the attention of the art since the structure of vitamin A was first disclosed by Karrer in 1933. Many routes for its synthesis have been advanced and a considerable body of literature has been developed concerning the preparation of vitamin A, vitamin A active materials and vitamin A intermediates. Because of the demand for vitamin A and the market which exists for this compound, efforts are constantly being made to devise both new and improved methods for the preparation of intermediate compounds which can be employed in the production of vitamin A.

One of the routes for obtaining vitamin A involves the conversion of the intermediate, vitamin A aldehyde, to vitamin A. This has been accomplished by Wendler et al., J. Am. Chem. Soc. 72, 234 (1950), by the treatment of vitamin A aldehyde with lithium aluminum hydride.

However, lithium aluminum hydride is an expensive reagent and more importantly requires extensive precautions and careful handling at all times, since it is a highly reactive material. It reacts violently with water liberating hydrogen. It will react not only with the moisture in the atmosphere but also with the carbon dioxide present. Under certain circumstances reaction products with carbon dioxide have been reported to be explosive on heating.

In lithium aluminum hydride reactions which involve the liberation of hydrogen, provision must be made for the efficient removal of this highly combustible gas. In fact, not only is hydrogen combustible, but so is lithium aluminum hydride. Even in moisture free media, it will react with occluded oxygen. Adequate provisions must be made at all times for storing and using this reagent in a moisture- and oxygen-free condition. The use of dry apparatus and dry solvents is imperative. Lithium aluminum hydride has toxic properties and should therefore be handled with extreme care. Thus it can be seen that lithium aluminum hydride is a dangerous reagent and its use requires elaborate safeguards and careful manipulation. Clearly then, it is not easily adapted to commercial procedures and even its employment on a laboratory scale is avoided wherever possible.

Accordingly, it is an object of the present invention to provide an improved method for obtaining vitamin A (vitamin A alcohol) directly from vitamin A aldehyde in high yields and in a high state of purity.

It is a further object to obtain vitamin A in a hazard-free, and less expensive manner than has been heretofore accomplished.

It is still another object to prepare vitamin A from vitamin A aldehyde in a manner that has commercial utility and in a manner that calls for relatively simple apparatus and manipulation.

Further objects will become apparent from the detailed description given hereinafter. It is intended however, that the detailed description and specific examples are not limiting but merely indicate the preferred embodiments of the invention since various changes and modifications within the scope of the invention will become apparent to those skilled in the art.

It has been unexpectedly discovered that the above and other objects can be achieved by reacting vitamin A aldehyde with formaldehyde in the presence of a base. By such procedure, there is obtained vitamin A (vitamin A alcohol) in high yields. This process is thus an improvement over S.N. 665,129, Klein, filed June 12, 1957, now Patent No. 2,907,796, in which vitamin A aldehyde is converted, by reaction with silver oxide, to vitamin A and vitamin A acid.

The process of the present invention, at first glance, appears to be the crossed Cannizzaro reaction in which an aldehyde, upon reaction with formaldehyde and in the presence of a base, is converted to its corresponding alcohol while the formaldehyde is converted to a salt of formic acid. However, as pointed out by Geissman in "Organic Reactions," John Wiley and Sons, copyright 1944, vol. II, pp. 102–103, $\alpha,\beta$-unsaturated aldehydes. (a member of which is vitamin A aldehyde) do not undergo the normal Cannizzaro reaction. Instead, dismutation with cleavage of the $\alpha,\beta$-unsaturated bond occurs. Hence, it was unexpected to find that under certain specified reaction conditions the $\alpha,\beta$-unsaturated bond of vitamin A aldehyde remained intact and vitamin A alcohol (vitamin A) was formed in excellent yield and purity.

The vitamin A aldehyde used in carrying out this invention may be obtained from any desired source. For instance, it may be obtained by the process of S.N. 545,122, Klein and Grassetti, filed November 4, 1955, now U.S. Patent No. 2,819,311, issued January 7, 1958.

Example I 50 mg. of vitamin A aldehyde of 53.5% purity and having an ultraviolet absorption maximum at 3750 A. were admixed with 2 ml. of methanol and one ml. of formalin. The resulting solution was heated to 65° C. and thereafter a solution of 1.2 grams of sodium hydroxide dissolved in 1.2 ml. of water was added. Then the solution of vitamin A aldehyde, formalin and sodium hydroxide was heated for 10 minutes on a steam bath. After heating, the reaction mixture was cooled and worked up by extraction with hexane in the following manner. The aqueous phase of the reaction mixture was extracted three to four times with equal portions of hexane, the portions of hexane being equal to about one-third of the total volume of the reaction mixture. Thereafter the combined hexane extracts were successively washed with water, saturated aqueous NaCl solution, and finally with water again. The alkali-free hexane fraction was then dried over sodium sulfate and filtered. The filtrate was carefully evaporated in vacuo at temperatures maintained below about 50° C. in order to remove the hexane and recover the product. A 26% yield of vitamin A (vitamin A alcohol) calculated as 100% (pure) vitamin A alcohol, was recovered from the hexane. Upon ultra-violet spectographic analysis, a $\lambda$ max=3250 A. was found which indicated the presence of vitamin A. The vitamin A aldehyde absorption maximum at 3750 A. had disappeared.

Example II 10.8 mg. of vitamin A aldehyde of 53.5% purity were admixed with one ml. formalin, 2 ml. of methanol, 1.2 grams of sodium hydroxide and 1.2 ml. of water. The temperature rose to 50° C. almost immediately without any external heating and was maintained at this temperature for several minutes. Thereafter the reaction mixture was cooled, diluted with water and worked up with hexane as indicated in Example I. The hexane or neutral fraction contained vitamin A, which upon analysis demonstrated a λ max=3250 A. A 53% yield was obtained. Upon acidification of the aqueous (alkaline) phase and subsequent extraction of hexane, virtually no vitamin A acid could be detected by ultra-violet spectral analysis.

Example III 25.6 mg. of vitamin A aldehyde of 91% purity (estimated) but contaminated by anhydro vitamin A were dissolved in 5 ml. of methanol and one ml. of formalin and subsequently treated with one ml. of a 50% aqueous solution of sodium hydroxide. The temperature of the solution rose spontaneously to 50° C. After stirring for 10 minutes, the reaction mixture was diluted with water and worked up with hexane as in Example I. A 68% yield of vitamin A alcohol was obtained which was identified by its ultra-violet and infra-red spectra which agreed with that of known vitamin A.

Example IV 25.6 mg. of vitamin A aldehyde of 91% purity (estimated) but contaminated by anhydro vitamin A were dissolved in 5 ml. of methanol and one ml. of formalin and subsequently treated with one ml. of a 50% aqueous solution of sodium hydroxide. The temperature of the solution rose spontaneously to 50° C., and was thereafter heated at steam bath temperature for 20 minutes. The reaction mixture was cooled down and extracted with hexane. Considerable attrition of vitamin A occurred as indicated by an ultra-violet analysis of the product.

Example V 0.2395 gm. of

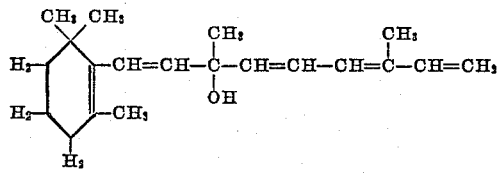

was dissolved in 25 ml. of dioxane and this solution added to 0.4578 gm. of hexamethylene tetramine boron trifluoride complex dissolved in 2.5 ml. of water. The complex contained an average of 2 molecules of boron trifluoride for each molecule of hexamethylene tetramine. The reaction mixture was allowed to stand for one-half hour at room temperature and then refluxed with 7 ml. of water for one-half hour. In this manner, vitamin A aldehyde was obtained. (This procedure is described and claimed in copending U.S. application Serial No. 679,519, Grassetti, filed August 21, 1957, now U.S. Patent 2,862,031, issued November 25, 1958.) To the above reaction mixture containing vitamin A aldehyde, 5 ml. of formalin was added, followed by the addition of 5 ml. of a 50% solution of aqueous sodium hydroxide which discharged the orange color of the solution. The temperature of the two phase reaction mixture was maintained at 60° C. and heating for an additional 10 minutes was carried out. Nevertheless, only vitamin A aldehyde (70% uncontaminated by anhydro vitamin A) was obtained.

The failure to obtain vitamin A in this instance was attributed to the fact that the reaction was carried out in a two phase system. A homogeneous or single phase system appears to be a requisite in order to convert vitamin A aldehyde to vitamin A as shown in the following example.

Example VI 0.2415 gm. of

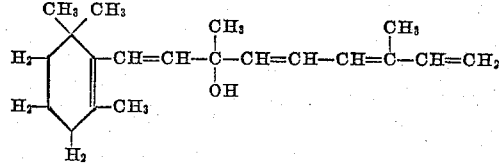

was dissolved in 25 ml. of dioxane and then added to 0.4578 gm. of boron trifluoride hexamethylene tetramine complex dissolved in 2.5 ml. of water. This complex contained two molecules of boron trifluoride for each molecule of hexamethylene tetramine. The resulting mixture was allowed to stand at room temperature for one-half hour. Then 6.7 ml. of water were added and the mixture refluxed for one-half hour in order to form vitamin A aldehyde. The reaction mixture was cooled to room temperature and treated with 15 ml. of methanol, 10 ml. of formalin (a 37% by weight aqueous solution of formaldehyde) and 10 ml. of a 50% by weight aqueous solution of sodium hydroxide. The reaction temperature rose spontaneously to 60° C. An additional 10 ml. of methanol were added to make the reaction mixture completely homogeneous. After heating at a reaction temperature of 60° C. for an additional five minutes, the solution was divided into two equal parts (parts A and B below).

*Part A.*—This portion was worked up immediately with hexane as done in Example I. A 43% yield of vitamin A was obtained.

*Part B.*—This portion of the solution was heated at 60° C. for an additional one hour and fifteen minutes. The reaction product was obtained by extraction with hexane and examined spectroscopically. As indicated by the ultra-violet curve, considerable attrition of the vitamin A occurred.

Example VII

This example is similar to the preceding example in that a one phase system has been provided.
0.2415 gm. of

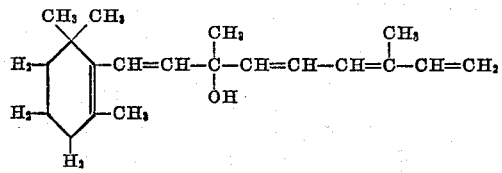

was dissolved in 25 ml. of dioxane and then added to 0.4578 gm. of boron trifluoride hexamethylene tetramine complex dissolved in 2.5 ml. of water. This complex contained two molecules of boron trifluoride for each molecule of hexamethylene tetramine. The resulting mixture was allowed to stand at room temperature for one-half hour. Then 6.7 ml. of water were added and the mixture refluxed for one-half hour in order to form vitamin A aldehyde. The reaction mixture was cooled to 5° C. and treated at this temperature with 25 ml. of methanol, 10 ml. of formalin and 10 ml. of a 50% by weight aqueous solution of sodium hydroxide. The resulting homogeneous solution was divided into two equal portions (parts A and B).

*Part A.*—This portion was allowed to stand at room temperature overnight. When worked up with hexane a yield of 50.7% of vitamin A was obtained. Acidification and extraction of the aqueous alkaline phase showed only 1.34% of vitamin A acid which had a λ max=3500 A.

*Part B.*—This portion was allowed to stand overnight at 5° C. Upon extraction and workup, a 49% yield of vitamin A was obtained.

Example VIII 50 mg. of vitamin A aldehyde concentrate, containing 46.5% of vitamin A aldehyde

[λ max= 3800 A. and $E_{1cm}^{1\%}$=700]

were dissolved in 9.5 ml. of methanol and treated with 2.8 ml. of formalin. This solution was cooled to 5° C. and 6 ml. of a 50% by weight aqueous solution of sodium hydroxide was added. During addition an ice bath was used to prevent the temperature from rising above 35° C. After standing at room temperature for 1½ hours, the reaction mixture was worked up with pentane. 32.7 mg.

of product were thereby recovered which was identified as vitamin A by its λ max of 3250 A. and $$E_{1\ cm.}^{1\%} = 940$$

The net yield was 74.2%.

Example IX 100 mg. of vitamin A aldehyde of same purity as Example VIII were dissolved in 15 ml. of methanol and treated with 5.6 ml. of formalin. The solution was then cooled to 5° C. whereupon 12 ml. of a 50% by weight aqueous solution of sodium hydroxide were added. The temperature was kept below 45° C. The solution was allowed to stand for 1¼ hours at room temperature and then worked up with ether. A 72% net yield of vitamin A alcohol (vitamin A) was obtaineed.

Example X

For purposes of comparison, a reduction of the aldehyde with lithium aluminum hydride was carried out as follows.

100 mg. of vitamin A aldehyde of same purity as Examples VIII and IX were dissolved in 25 ml. of diethyl ether and the resulting solution was added to 200 mg. of lithium aluminum hydride dissolved in 25 ml. of diethyl ether. After stirring for 25 minutes at room temperature the reaction mixture was decomposed with ethyl acetate followed by addition of water. The ether layer was decanted from the pasty salts, washed with a 10% sodium hydroxide solution, then washed with water and salt water. The ether fraction was then dried over sodium sulfate, and filtered. Upon evaporation of the ether, a net vitamin A yield of 72% was obtained. The λ max of the vitamin A was 3250 A. Thus our procedure and the prior art procedure employing lithium aluminum hydride give comparable yields, and comparable spectral curves.

Example XI 54.2 mg. of β-ionylidene acetaldehyde (λ max = 2730 A. and 3260 A. and $E_{1\ cm.}^{1\%} = 450$ and 510 respectively)

were dissolved in 10 ml. of methanol. To this solution 2.9 ml. of formalin were added and the solution cooled to 5° C. A 6 ml. solution of 50% sodium hydroxide was then added. The temperature was held below 35° C. during addition. The solution was allowed to stand for 1½ hours and thereafter worked up with pentane. A net yield of 70% of β-ionylidene ethanol was obtained having a new λ max = 2460 and 2700 A. The old λ max of β-ionylidene acetaldehyde at 3260 A. had completely disappeared.

We have found that the reaction temperature may range from about 5° to 75° C., preferably from about 5° to 50° C. The length of time for reaction may vary from several minutes to 24 hours although up to two hours is preferred. As the examples demonstrate, the higher the reaction temperature, the shorter the reaction time must be in order to avoid attrition of the vitamin A. For instance, a reaction temperature of 60° C. may be used if the reaction time is 5 minutes (Example VI–A); however, a reaction temperature of 60° C. and a reaction time of 1¼ hours is not desirable (Example VI–B).

The ratio of the two reactants is from about 25 to 175 ml. of formalin solution per gram of the α,β-unsaturated aldehyde. Preferably about 35 to 55 ml. of formalin per gram of α,β-unsaturated aldehyde are employed. The formaldehyde is used preferably as formalin which is an approximately 37% by weight aqueous solution of formaldehyde although formaldehyde itself may be used. Furthermore, formaldehyde in any of its polymeric forms such as paraformaldehyde, trioxane, etc. may be used. Additionally, compounds liberating formaldehyde upon heating may be used such as hexamethylene tetramine or monomethylol dimethyl hydantoin. Quantities of such materials may be based upon the aforesaid equivalent amounts of formalin used i.e., there should be from about 9.25 to 65 ml., preferably about 13 to 20 ml., of formaldehyde per gram of aldehyde.

The amount of alkali present which may be e.g., sodium hydroxide, potassium hydroxide or other strong bases should be present at least in an amount of one equivalent of said base per equivalent of α,β-unsaturated aldehyde. Of course, an excess may be used and such is preferred. The base is added conveniently in the form of a 50% by weight aqueous solution.

In order to insure a homogeneous reaction mixture, i.e., a single phase system which we have found to be an important feature of our invention, the reaction medium must comprise a solvent for both reactants. Since water is also present, the solvent previously referred to must be miscible with the water as well. The relatively more polar solvents are preferred i.e., solvents such as methanol, isopropanol, dioxane, acetonitrile, formamide, etc., or suitable combinations thereof. Generally, the solvent is present in an amount from about 0.4 to 2.5 volumes of solvent per volume of total reactants.

The quantity of water in the system is not critical i.e., the addition of water besides that which is introduced with formalin or the aqueous solution of the base is not necessary. However, this does not preclude use of additional amounts of water. If additional quantities of water are used, care must be taken to assure a homogeneous system and this may be accomplished by the addition of appropriate amounts of organic solvent.

As the examples have indicated, various $\Delta^{2,4}$-unsaturated aldehydes may be successfully converted to their corresponding alcohols. Other aldehydes that may be treated are α-ionylidene acetaldehyde, and α-vitamin A aldehyde.

Having thus described our invention what we claim as new and desire to secure by Letters Patent is:

1. A process for converting a $\Delta^{2,4}$-unsaturated aldehyde selected from the group consisting of vitamin A aldehyde, β-ionylidene acetaldehyde, α-vitamin A aldehyde and α-ionylidene acetaldehyde to its corresponding alcohol which comprises preparing an aqueous alkaline homogeneous single phase system containing said $\Delta^{2,4}$-unsaturated aldehyde and formaldehyde, maintaining a temperature of from about 5° C. to 75° C. for a period of time of from about several minutes to 24 hours and thereafter recovering the resulting $\Delta^{2,4}$-unsaturated alcohol.

2. A process for converting a $\Delta^{2,4}$-unsaturated aldehyde selected from the group consisting of vitamin A aldehyde, β-ionylidene acetaldehyde, α-vitamin A aldehyde and α-ionylidene acetaldehyde to its corresponding alcohol which comprises preparing an aqueous alkaline homogeneous single phase system containing said $\Delta^{2,4}$-unsaturated aldehyde and formaldehyde, maintaining a temperature from about 5° C. to 50° C. for a period of time from about several minutes to 2 hours and thereafter recovering the resulting $\Delta^{2,4}$-unsaturated alcohol.

3. A process for converting a $\Delta^{2,4}$-unsaturated aldehyde selected from the group consisting of vitamin A aldehyde, β-ionylidene acetaldehyde, α-vitamin A aldehyde and α-ionylidene acetaldehyde to its corresponding alcohol which comprises preparing an aqueous homogeneous single phase system containing said $\Delta^{2,4}$-unsaturated aldehyde and formaldehyde, there being about 9.25 to 65 ml. of formaldehyde per gram of aldehyde and at least one equivalent of alkali per equivalent of said $\Delta^{2,4}$-unsaturated aldehyde, maintaining a temperature from about 5° C. to 50° C. for a period of time from about several minutes to 2 hours and thereafter recovering the resulting $\Delta^{2,4}$-unsaturated alcohol.

4. The process of claim 3 in which said $\Delta^{2,4}$-unsaturated aldehyde is vitamin A aldehyde.

5. The process of claim 3 in which said $\Delta^{2,4}$-unsaturated aldehyde is β-ionylidene acetaldehyde.

6. The process of claim 3 in which said single phase system is prepared by introducing a solvent for said $\Delta^{2,4}$-unsaturated aldehyde and formaldehyde.

7. The process of claim 6 in which said solvent is a polar solvent.

8. The process of claim 7 in which methanol is said solvent.

9. A process for converting vitamin A aldehyde to vitamin A which comprises preparing an aqueous homogeneous single phase system containing said vitamin A aldehyde and formaldehyde, there being from 9.25 to 65 ml. of formaldehyde per gram of vitamin A aldehyde and at least one equivalent of alkali per equivalent of said vitamin A aldehyde, maintaining a temperature of from 5° to 75° C. for a period of time from about several minutes to 24 hours and thereafter recovering said vitamin A.

10. The process of claim 9 in which formaldehyde is present in an amount of from about 13 to 20 ml. per gram of vitamin A aldehyde.

11. The process of claim 9 in which said temperature is from about 5° C. to 50° C. and said time is from about several minutes to about 2 hours.

12. The process of claim 11 in which formaldehyde is introduced as an approximately 37% by weight aqueous solution thereof.

13. The process of claim 11 in which said base is introduced as an approximately 50% by weight aqueous solution thereof.

14. The process of claim 11 in which said single phase system is prepared by introducing a solvent for said vitamin A aldehyde and formaldehyde.

15. The process of claim 14 in which said solvent is a polar solvent.

16. The process of claim 15 in which methanol is said solvent.

References Cited in the file of this patent

UNITED STATES PATENTS 2,418,290    Bruson et al. _____ Apr. 1, 1947